US011989412B2

(12) United States Patent
Chujo

(10) Patent No.: US 11,989,412 B2
(45) Date of Patent: May 21, 2024

(54) STORAGE SYSTEM AND METHOD FOR MINIMIZING NODE DOWN TIME

(71) Applicant: Hitachi, Ltd., Tokyo (JP)

(72) Inventor: Norio Chujo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 129 days.

(21) Appl. No.: 17/701,000

(22) Filed: Mar. 22, 2022

(65) Prior Publication Data
US 2022/0404967 A1 Dec. 22, 2022

(30) Foreign Application Priority Data
Jun. 22, 2021 (JP) .................................. 2021-103479

(51) Int. Cl.
*G06F 3/06* (2006.01)
(52) U.S. Cl.
CPC .......... *G06F 3/0604* (2013.01); *G06F 3/0655* (2013.01); *G06F 3/0679* (2013.01)
(58) Field of Classification Search
CPC .... G06F 3/0604; G06F 3/0655; G06F 3/0679; G06F 11/1666; G06F 2212/1032; G06F 2212/1056; G06F 2212/154; G06F 12/0868; G06F 2212/286; G06F 2212/305; G06F 2212/312
See application file for complete search history.

(56) References Cited

U.S. PATENT DOCUMENTS

| | | | |
|---|---|---|---|
| 6,587,909 B1* | 7/2003 | Olarig | G06F 13/4081 710/302 |
| 9,772,913 B1* | 9/2017 | Mutnury | G06F 11/2017 |
| 2003/0084245 A1* | 5/2003 | Tanaka | G06F 12/0893 713/1 |
| 2011/0145633 A1* | 6/2011 | Dickens | G06F 11/073 714/6.1 |
| 2013/0254446 A1* | 9/2013 | Han | G06F 11/1666 710/304 |
| 2016/0179436 A1* | 6/2016 | Chen | G06F 3/065 713/323 |
| 2016/0320976 A1* | 11/2016 | Yamada | G06F 3/065 |
| 2020/0409604 A1 | 12/2020 | Tajima et al. | |
| 2022/0382638 A1* | 12/2022 | Martin | G06F 12/1009 |

FOREIGN PATENT DOCUMENTS

JP 2021-005121 A 1/2021

\* cited by examiner

*Primary Examiner* — Michael Krofcheck
(74) *Attorney, Agent, or Firm* — Volpe Koenig

(57) ABSTRACT

A storage system includes a CPU, a first memory module, a second memory module, and a storage device. The processor and the first memory module are installed in the same node. The second memory module are replaceable without shutting down power supply of the node. The first memory module stores an operating system and a program for managing user data to be stored in the storage device. The second memory module stores cache data of the user data to be stored in the storage device. The processor is configured to store a copy of data to be stored in the second memory module in the third memory module.

9 Claims, 8 Drawing Sheets

STORAGE SYSTEM AND METHOD FOR MINIMIZING NODE DOWN TIME

CROSS-REFERENCE TO PRIOR APPLICATION

This application relates to and claims the benefit of priority from Japanese Patent Application No. 2021-103479 filed on Jun. 22, 2021, the entire disclosure of which is incorporated herein by reference.

BACKGROUND

The present disclosure relates to technologies for memory failures in a storage system.

Storage systems including a plurality of nodes are known as storage systems that store and manage various types of data. For example, a node includes a computer having a CPU and a memory. The memory of a node stores an operating system, applications for operating as a storage system (also called simply App), cache data for data stored in a drive (user data), and control information for managing the user data stored in a drive.

RAM (Random Access Memory) is used as memory of the node, and if the power supply to the node is interrupted, a problem that the stored data will be lost occurs.

In contrast, Japanese Patent Application Publication No. 2021-5121 discloses a technology that allows access to control information that was managed before the power supply interrupted by storing the control information in a nonvolatile medium.

SUMMARY

For example, if a memory failure occurs, the memory must be removed to be replaced. For example, in a node where memory is directly connected to the CPU, the node must be powered down, that is the node must be blocked, which degrades the performance of the storage system.

The purpose of the present disclosure is to provide a technology that can reduce the occurrence of a situation in which a node must be blocked in the case that a memory failure occurs.

In order to achieve the above-mentioned purpose, a storage system according to one aspect is a storage system includes, a processor, a first memory module, a second memory module, and a storage device. The processor and the first memory module are installed in the same node. The second memory module is replaceable without shutting down power supply of the node. The first memory module stores an operating system and a program for managing user data to be stored in the storage device. The second memory module stores cache data of the user data to be stored in the storage device. The processor is configured to store a copy of data to be stored in the second memory module in the third memory module.

DETAILED DESCRIPTION

Embodiments will be described with reference to the drawings. The embodiments described below are not intended to limit the invention of the claims, and all of the elements and combinations thereof described in the embodiments are not always essential for the solving means of the invention.

Figure 1:
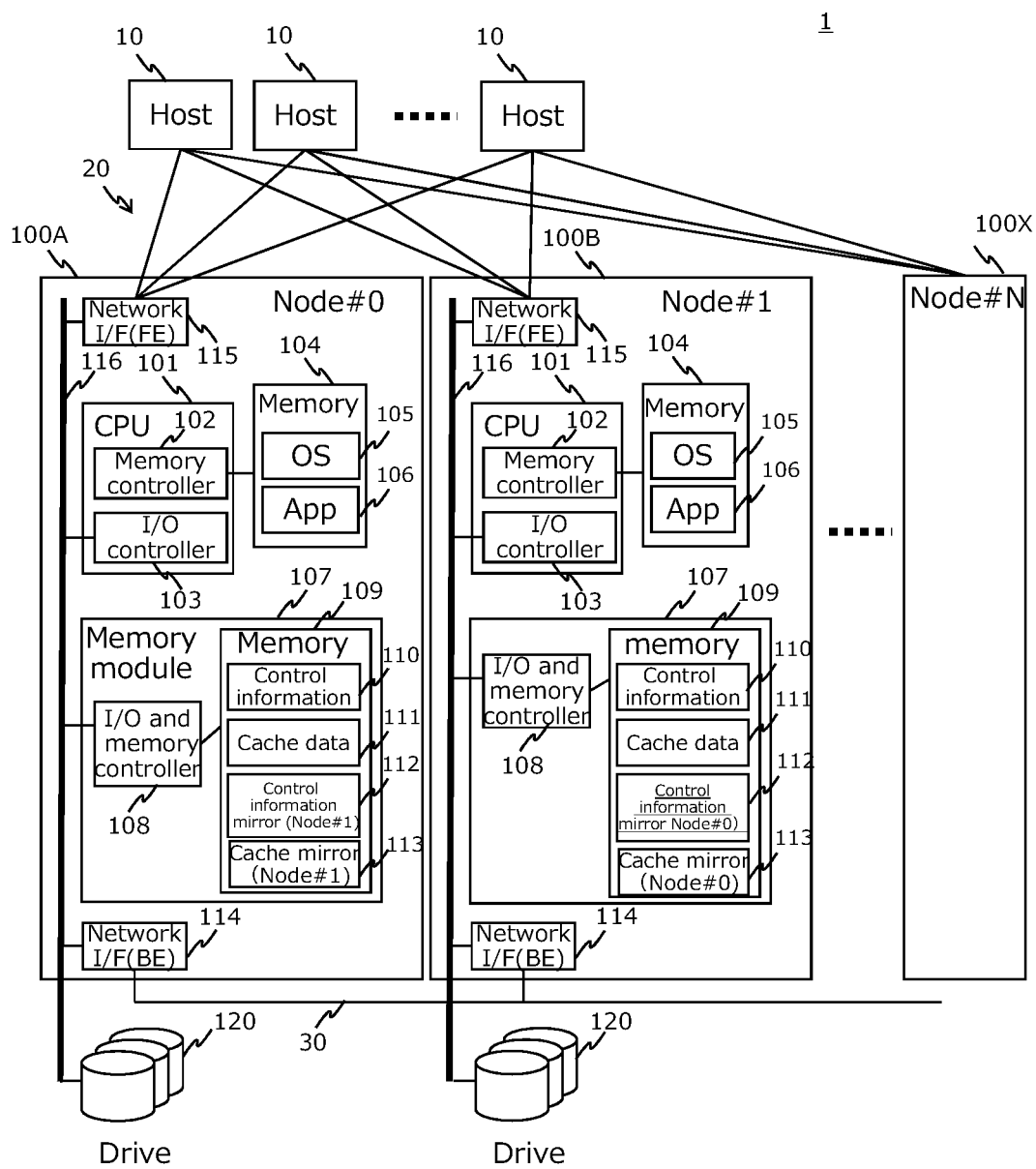
FIG. 1 is an overall configuration diagram of a storage system according to a first embodiment.

FIG. 1 is an overall configuration diagram of a storage system according to a first embodiment.

The storage system 1 includes one or more hosts 10, a plurality of nodes 100 (100A, 100B, . . . , 100X), and a plurality of drives 120. The host 10 and the node 100 are coupled via network 20. The node 100 and the drive 120 are coupled via bus 116. Each node 100 is coupled via a backend network 30.

The network 20 is a communication channel such as a wired LAN (Local Area Network) or a wireless LAN. The backend network 30 is a communication channel such as a wired LAN, wireless LAN.

The host 10 performs various processes using data (user data) managed by the storage system 1.

The node 100 is, for example, a computer such as a PC (PC Personal computer) or server. The node 10 includes a CPU Central Processing Unit) 101 as an example of a processor, a memory module 104, a memory module 107, a network I/F (interface) 114, a network I/F 115, and a bus 116. The memory module 104 is connected to the CPU 101. The CPU 101, the memory module 107, the network I/F 114, and the network I/F 115 are coupled to each other via the bus 116. One or more drives 120 (an example of a storage device) are coupled to the bus 116.

The drive 120 is an example of a storage device, and is a hard disk, a flash memory, or the like. The drive 120 stores data such as user data or the like. The drive 120 may be located inside the node 100, or it may be located outside the node 100.

Network I/F 115 is, for example, an interface such as a wired LAN card or a wireless LAN card, and communicates with other apparatuses (for example, host 10) via the network 20.

Network I/F 114 is, for example, an interface such as a wired LAN card or a wireless LAN card, and communicates with other apparatuses (for example, other nodes 1) via the backend network 30.

The CPU 101 executes various processes according to programs (operating systems (OS), applications (processing programs), etc.) that are stored in the memory module 104. The CPU 101 includes a memory controller 102 and an I/O controller 103. The memory controller 102 controls access to data stored in the memory module 104. The I/O controller 103 controls I/O to various modules that are coupled via bus 116. The I/O controller 103 detects an installation or removal of module to or from the bus 116 and controls I/O according to the state of the module.

The memory module 104 (an example of a first memory module) is connected to the memory controller 102 and cannot be replaced without powering down the node 100.

Here, "cannot be replaced" does not mean that it cannot be physically replaced, but rather that it cannot be replaced without causing abnormalities in the operation of CPU 101. The memory module 104 is, for example, a RAM (RANDOM ACCESS MEMORY) memory chip and stores programs executed by CPU 101 and necessary information. In this embodiment, the memory module 104 stores an OS 105 and applications (also referred to simply as Apps) 106. The application 106 executes processes such as process of controlling I/O of user data to be stored in the drive 120, process related to the replacement of the memory modules 107, and the like.

The memory module 107 (an example of a second memory module) includes an I/O and memory controller 108 and a memory chip 109. The I/O and memory controller 108 includes a function of controlling accesses to the data stored on memory chip 109 and a function of recognizing the memory module 107 via the bus 116 and controlling communication via bus 116. The I/O and memory controller 108 also includes a function (RAS function) of detecting the number of errors that have occurred on the memory chip 109 and notifying the CPU 101 of the state if more than a predetermined number of errors have occurred. The memory module 107 has an I/O memory controller 108 and can be replaced when the node 100 is not powered down. Specifically, the memory module 107 is removable, that is this make the CPU 101 and the like to recognize that the memory module 107 has been removed and not to perform any processing on the memory module 107. And the memory module 107 is installable when the power of the node 100 is not powered down, that is this make the CPU 101 and the like to recognize that the memory module 107 has been installed and to initiate processing on the memory module 107.

The memory chip 109 is a RAM chip, for example, and stores control information 110 that manages the user data stored in drive 120, cache data 111 of the user data stored in the drive 120, control information mirror 112 which is a copy of control information of other node 100, and cache data mirror 113 which is a copy of the cache data 111 of another node 100. For example, the control information mirror 112 and cache mirror 113 corresponding to the control information 110 and cache data 111 of the node 100A are stored in the Memory module 107 of node 100B (an example of a third memory module). The control information 110 and cache data 111 are provided per each node 100, or may be provided per each predetermined data unit (for example, volume) managed in node 100. When control information 110 and cache data 111 are provided per each predetermined data unit, the control information mirror 112 and cache mirror 113 corresponding to these are stored in the memory module 107 of different nodes 100.

Figure 2:
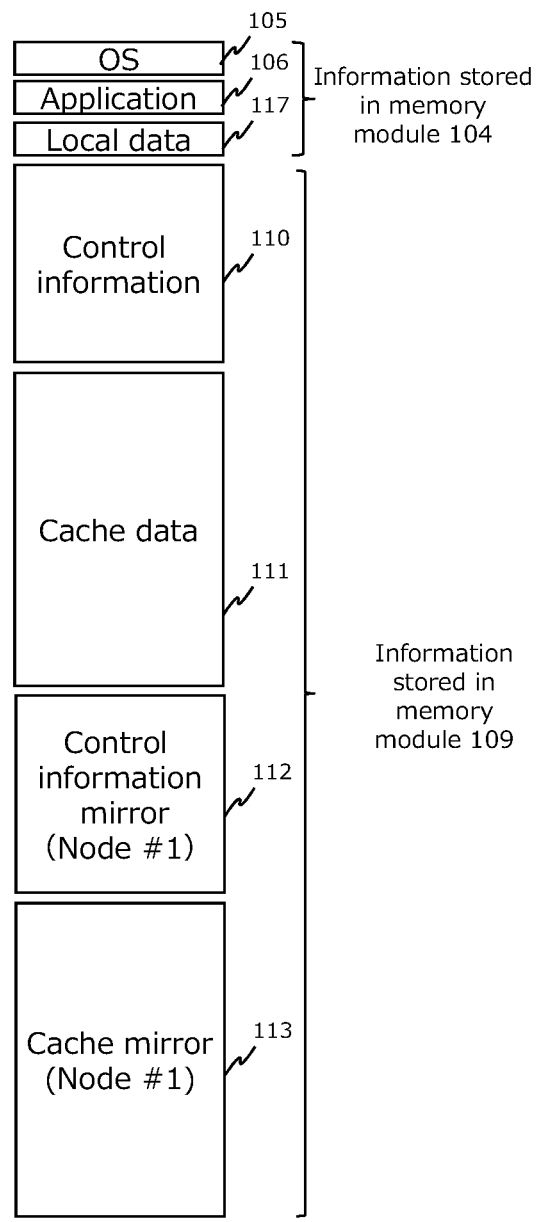
FIG. 2 is a diagram for explaining a memory map related to a node according to the first embodiment.

FIG. 2 is a diagram for explaining a memory map related to a node according to the first embodiment. FIG. 2 shows a memory map of information (data) that needs to be managed in memory with respect to one node.

The information that needs to be managed in memory with respect to the node 100 includes the OS 105, the application 106, local data 117, the control information 110, the cache data 111, the control information mirror 112, and the cache mirror 113.

In this embodiment, the OS 105, the application 106, and the local data 117 with relatively small amounts of data are stored in memory module 104, and the control information 110, the cache data 111, the control information mirror 112, and the cache mirror 113 with the relatively large amount of data are stored in memory module 109.

The amount of data stored in the memory module 104 is small, and the memory capacity required for the memory module 104 is small. Therefore, the probability of memory failure is small. Since the required memory capacity can be reduced, the memory chip in the memory module 104 may be a highly reliable memory chip or a memory chip with strong error correction capability. In this way, the occurrence of memory failures can be further lowered.

On the other hand, the amount of data stored in the memory module 107 is large, and the memory capacity required for the memory module 107 is large. Therefore, the probability of memory failure is large. This increases the likelihood that the memory module 107 will need to be replaced. Since the required memory capacity is larger, the memory module 107 may be a memory chip with no error correction function or low correction capability to reduce cost. In this way, the occurrence of memory failures may be higher.

First, the normal (normal mode) operation of the storage system 1 is described.

Figure 3:
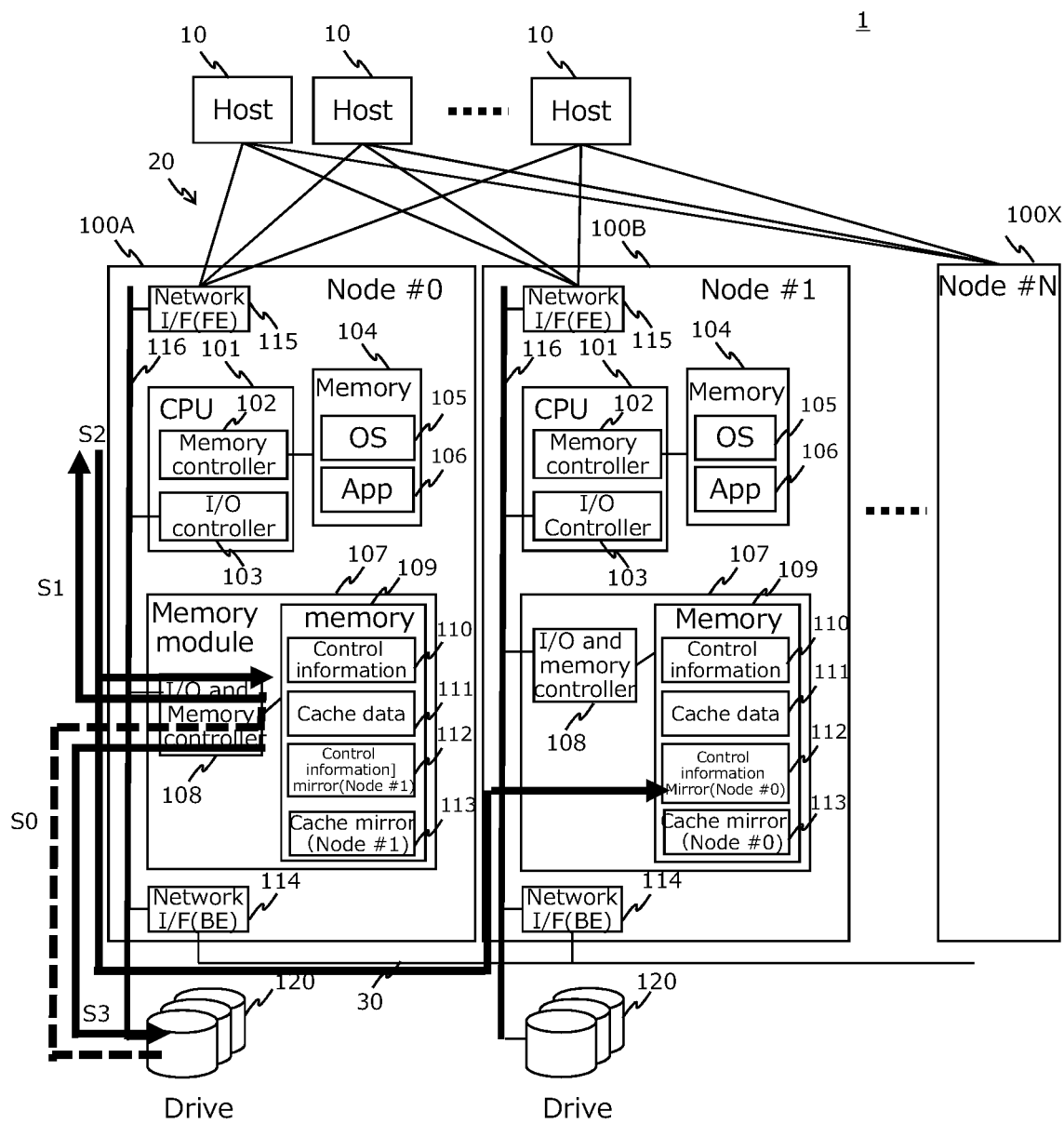
FIG. 3 is a diagram for explaining a normal operation of a storage system according to the first embodiment.

FIG. 3 is a diagram for explaining a normal operation of a storage system according to the first embodiment.

When a read request for user data is received from the host 10, if cache data for the user data corresponding to the read request exists in the memory chip 109 of the memory module 107, the CPU 101 of the node 100A reads out the user data from the memory chip 109 and send the User data to the request source host 10 (step S1). If there is no cache data for the user data corresponding to the read request, the CPU 101 of the node 100A reads out the user data from the drive 120 and caches the user data in the memory chip 109 (step S0) and send it to the request source host 10 (step S1).

When a write request for user data is received from the host 10, the CPU 101 of the node 100A stores write target user data as cache data in the memory chip 109 of the memory module 107 and stores the copy of the cache data in memory chip 109 of the memory module 107 of another node 100 which is a copy destination (a mirror destination) (in the example in FIG. 3, the node 100B) (step S2). The CPU 101 then stores the cache data 111 stored in the memory chip 109 of memory module 107 in the drive 120 (step S3).

The following describes the operation of the replacement of the memory module 107 of the storage system 1 (replacement mode).

Figure 4:
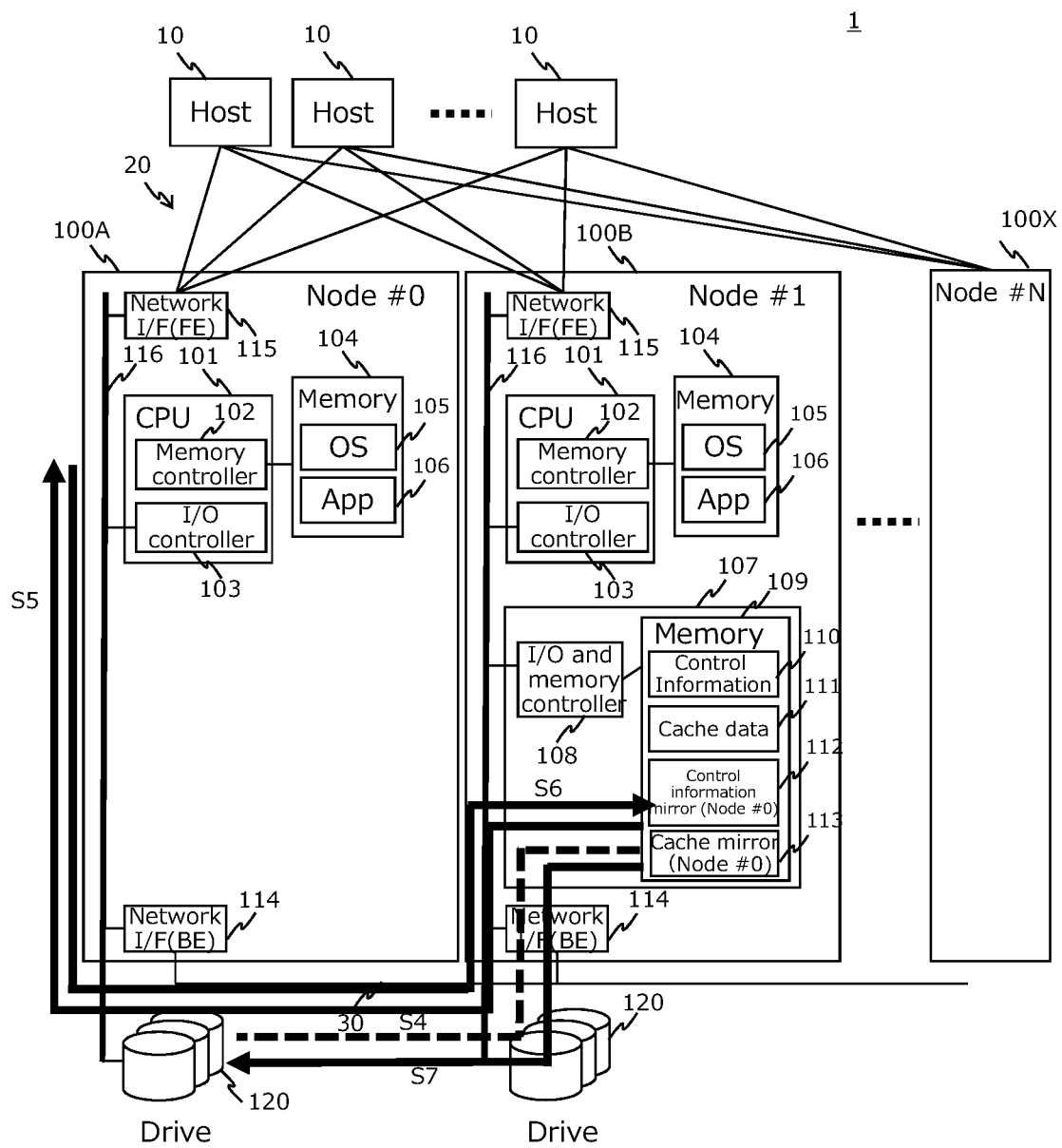
FIG. 4 is a diagram for explaining an operation of a storage system according to the first embodiment during memory module replacement.

FIG. 4 is a diagram for explaining an operation of a storage system according to the first embodiment during memory module replacement.

When a read request for user data is received from host 10, if the cache data of the user data corresponding to the read request exists in the memory module 107 of the other node 100 (100B) which is the mirror destination of the cache data, the CPU 101 reads out the user data from the memory chip 109 and sends it to the request source host 10 (step S5). while if the cache data for the user data corresponding to the read request does not exist in the memory chip 109, the CPU 101 reads out the user data from the drive 120 (step S4) and sends it to the request source host 10 (step S5).

When a write request for user data is received from the host 10, the CPU 101 stores the write target user data as cache data in the in the memory chip 109 of the mirror destination memory module 107 (step S6). A copy of the cache data may be stored in the memory chip 109 of the memory module 107 of another node 100. The CPU 101 then stores the cache data stored in memory chip 109 of the memory module 107 of the mirror destination node 100 in the drive 120 of the node 100A (step S7).

Thus, according to the storage system 1, the user data can be read and written without any problems even when the memory module is replaced.

Next, the processing operation of the storage system 1 is described.

Figure 5:
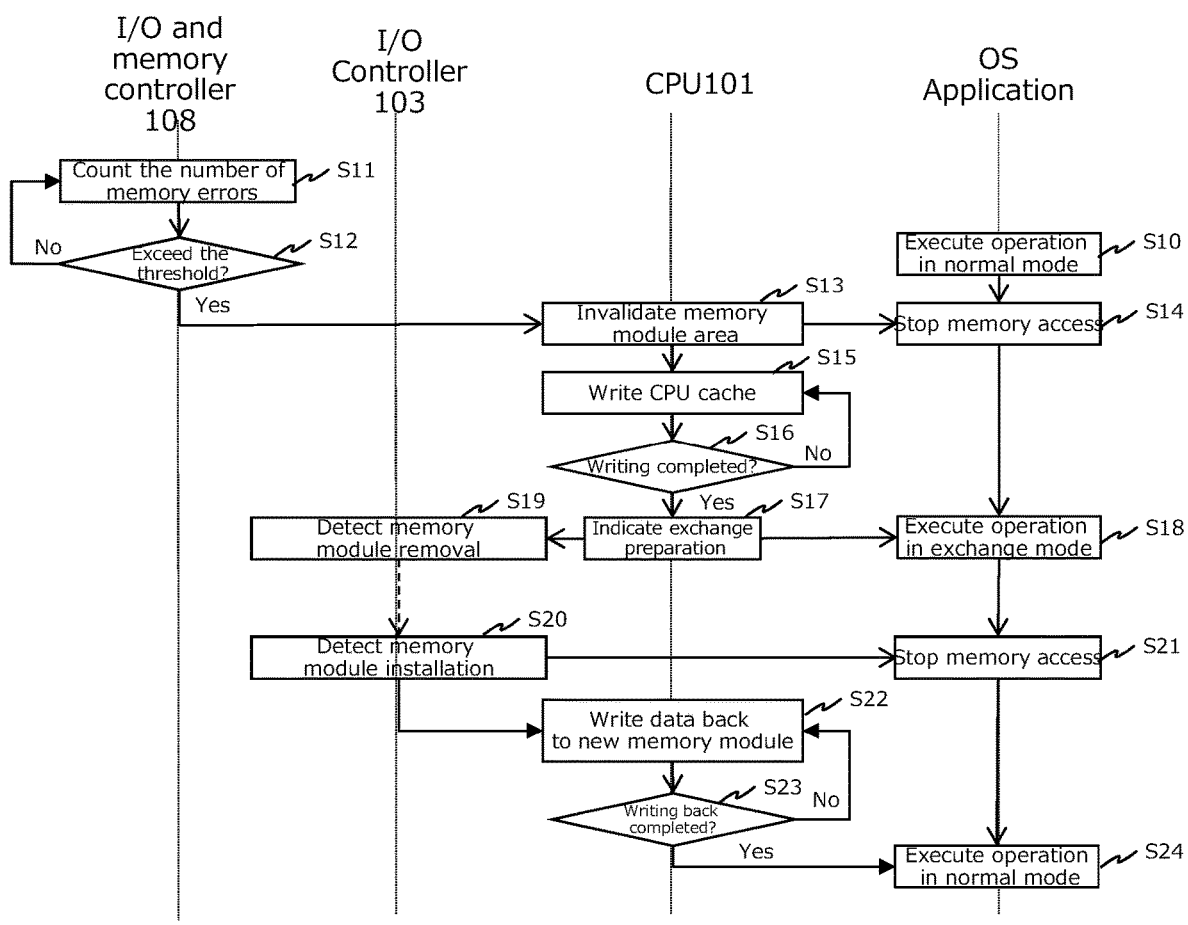
FIG. 5 is a flowchart for explaining a processing operation of a storage system according to the first embodiment.

FIG. 5 is a flowchart for explaining a processing operation of a storage system according to the first embodiment.

In the node 100 of storage system 1, CPU 101 executes an operation in the normal mode shown in FIG. 3 by executing the OS 105 and the application 106 (step S10).

At this time, the I/O and memory controller 108 of the memory module 107 counts the number of errors (memory error count) on the memory chip 109 (step S11), and determines whether or not the memory error count exceeds the predetermined threshold for determining that a failure has occurred (step S12). If the memory error count does not exceed the threshold (step S12: No), the I/O and memory controller 108 proceeds the processing to the step S11. On the other hand, if the memory error count exceeds the threshold (step S12: Yes), the I/O and memory controller 108 notify the CPU 101 that a failure has occurred.

Upon receiving notification that the failure has occurred, the CPU 101 invalidates an area of the memory module 107 (step S13), and stops accepting a I/O (read and write requests) from the host 100, and stops accessing to the memory chip 109 of the memory module 107 (step S14).

The CPU 101 writes data in the internal cache of the CPU 101 in the memory module 107 of the other node 100 which is the mirror destination of the memory module 107 via the backend network 30 (step S15).

Next, CPU 101 determines whether or not the writing of data in the internal cache is completed (step S16), and if the writing is not completed (step S16: No), then continues the processing of the step S15. On the other hand, if the writing is completed (Step S16: Yes), the CPU 101 indicates that writing of data in the internal cache of the CPU 101 and that readiness for replacement of the memory module 107 is ready (step S17). The readiness for replacement may be displayed on the notification target user's computer or may be notified by turning on a predetermined LED on the node 100.

In addition, the CPU 101 executes an operation in the exchange mode shown in FIG. 4 by executing the OS 105 and the application 106 (Step S18).

This allows the administrator of the node 100 can removes the failed memory module 107 from the node 100 without hindrance.

Then, when the memory module 107 is removed, the I/O controller 103 of the CPU 101 detects that the memory module 107 has been removed and performs processing corresponding to the fact that the memory module 107 has been removed (step S19).

After this, when a new memory module 107 (the new memory module is often different from the one before replacement, but for convenience, the same symbols as the one before replacement is used) is installed in node 100 by the administrator, the I/O controller 103 of the CPU 101 detects that the memory module 107 is installed and notifies the CPU 101 (step S20).

The CPU 101 stops accepting I/O (read and write requests) from host 10 and stopes an access associated with I/O to the memory chip 109 of the memory module 107 by executing the OS 105 and the application 106 (step S21).

The CPU 101 then execute a processing that the data (the cache data and the control information) mirrored in the memory module 107 of the mirror destination and the data (the control information mirror and the cache mirror) to which a new memory module 107 is a mirror destination are written back to the new memory module 107 (step S22).

Next, the CPU 101 determines whether or not the data write-back is complete (step S23), and if the write-back is not completed (step S23: No), then the CPU 101 continues the processing of step S22.

On the other hand, if the write-back is completed (step S23: Yes), the CPU 101 starts accepting I/O from the host 10 and starts the operating in normal mode by executing the OS 105 and the application 106 (step S24).

According to the above process, the failed memory module can be removed without hindrance, a new memory module can be installed, data can be written back to the new memory module, and operation in normal mode can be performed.

Next, the storage system according to the second embodiment will be described.

Figure 6:
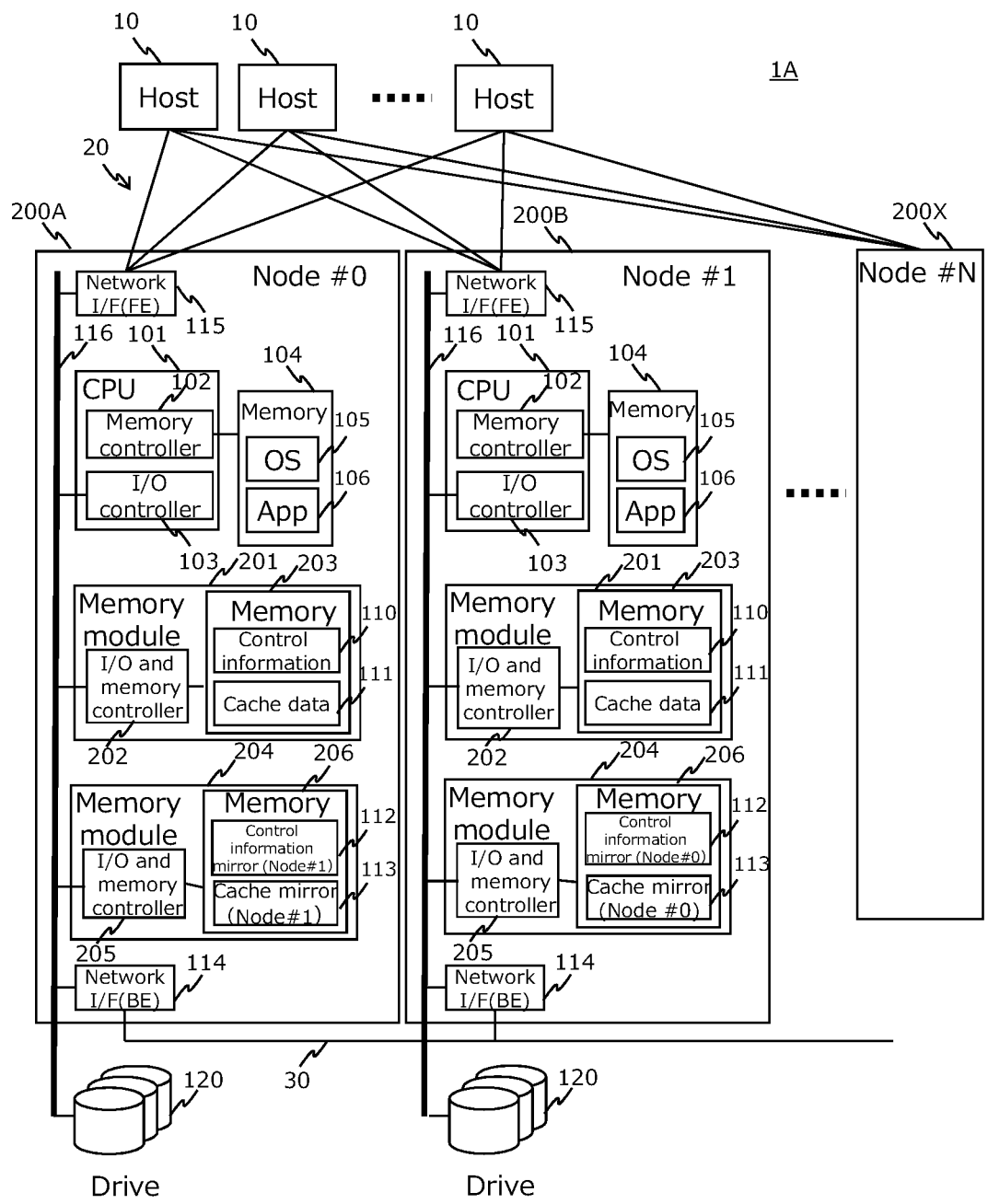
FIG. 6 is an overall configuration diagram of a storage system according to a second embodiment.

FIG. 6 is an overall configuration diagram of a storage system according to a second embodiment. The same symbols are used for the similar components as those of the storage system 1 according to the first embodiment.

A storage system 1A according to the second embodiment includes nodes 200 (200A, 200B, . . . , 200X) instead of the nodes 100 in the storage system 1.

The node 200 includes memory modules 201, 204 (an example of a first memory module).

The memory module 201 includes an I/O and memory controller 202 and a memory chip 203, and a memory module 204 includes an I/O and memory controller 205 and a memory chip 206. I/O and memory controllers 202, 205 have the same functions as the memory controller 108, and memory chips 203, 206 have the same functions as the memory chip 109.

In this embodiment, the control information 110 and the cache data 111 are stored in memory module 201, and the control information mirror 112 and the cache mirror 113 is stored in the memory module 204.

In storage system 1A, each memory module 201, 204 can be replace as a unit.

The CPU 101 executes the same process as shown in FIG. 5 as the processing related to replacement of the memory module 201. In the step S22 in FIG. 5, only the control information 110 and the cache data 111, which are the data to be stored in the memory module 201, are written back from the mirror destination memory module.

On the other hand, the CPU 101 executes the normal mode operation, and after detecting the installation of the new memory module 204, the CPU 101 write back only the control information mirror and the cache mirror, which are the data to be stored in the memory module 204, from the mirror destination memory module as the processing related to replacement of the memory module 204.

According to the storage system 1A, the amount of data to be written back when replacing the memory module can be suppressed, thereby reducing processing time. In addition, during replacing the memory module 2A, which does not store the control information 110 and the cache data 111, the operation in normal mode can be executed continuously.

Next, the storage system according to the third embodiment will be described.

Figure 7:
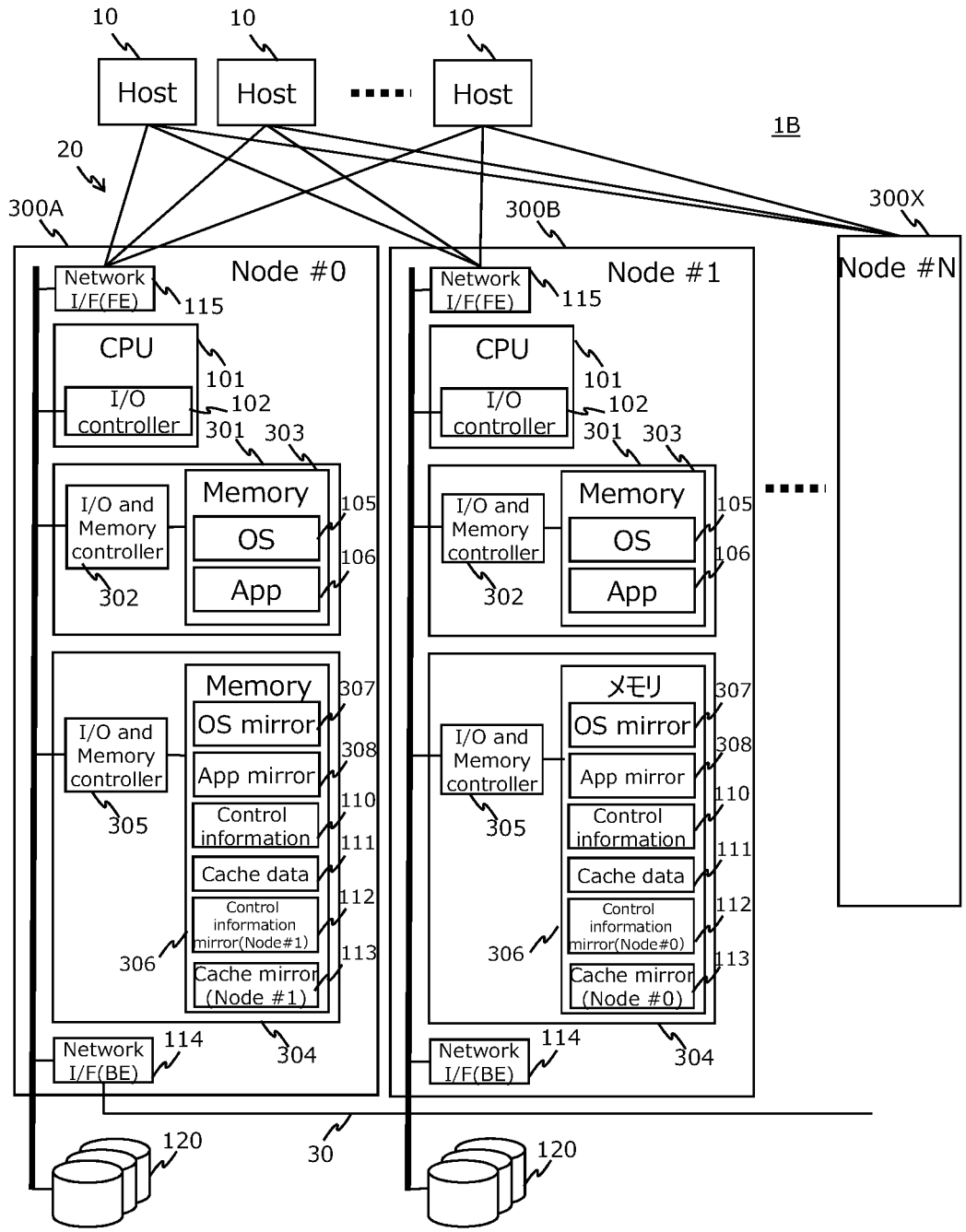
FIG. 7 is an overall configuration diagram of a storage system according to a third embodiment.

FIG. 7 is an overall configuration diagram of a storage system according to a third embodiment. The same symbols are used for the similar components as those of the storage system 1 according to the first embodiment.

The storage system 1B according to the third embodiment includes nodes 300 (300A, 300 300B, . . . , 300X) instead of the nodes 100 in the storage system 1.

The node 300 includes a memory module 301 (an example of a first memory module) and a memory module 304 (an example of a second memory module). The memory module 301 includes an I/O and memory controller 302 and a memory chip 303. The memory module 304 includes an I/O and memory controller 305 and memory chip 306. The I/O and memory controllers 302, 305 include the same function as the memory controller 108, and the memory chip 303, 306 have similar configuration as the memory chip 109.

The memory chip 303 of the memory module 301 stores an OS 105 and an application 106. The memory chip 306 of the memory module 305 stores control information 110, cache data 111, control information mirror 112, cache mirror 113, OS mirror 307 which is a copy the OS 105, and an application mirror 30 which is the copy of the application 106.

In the storage system 1B, each memory module 301, 304 can be replace as a unit.

The CPU 101 executes the same process as shown in FIG. 5 as a process related to replacement of the memory module 304. In step S22 in FIG. 5, the OS mirror 307 and the application mirror 308 that are data to be stored in memory module 304 are written back from the memory module 301.

On the other hand, in the process regarding the replacement of memory module 304, the CPU 101 executes the OS mirror 307 and the application mirror 308 of the memory module 304 to continue the operation in normal mode, after detecting an installation of the new memory module 301, recovers the OS 105 and application 106 by writing back the OS mirror 307 and the application mirror 308 of the memory module 304 to the memory module 301. The CPU 101 then executes the OS 105 and the applications 106 of the memory module 301.

According to the storage system 1B, when replacing the memory module 301 which stores the OS 105 and the application 104, the processing can be continued without powering down the node 300, and the node 300 can be returned to its original state after the memory module is replaced.

Next, the storage system according to the fourth embodiment will be described.

Figure 8:
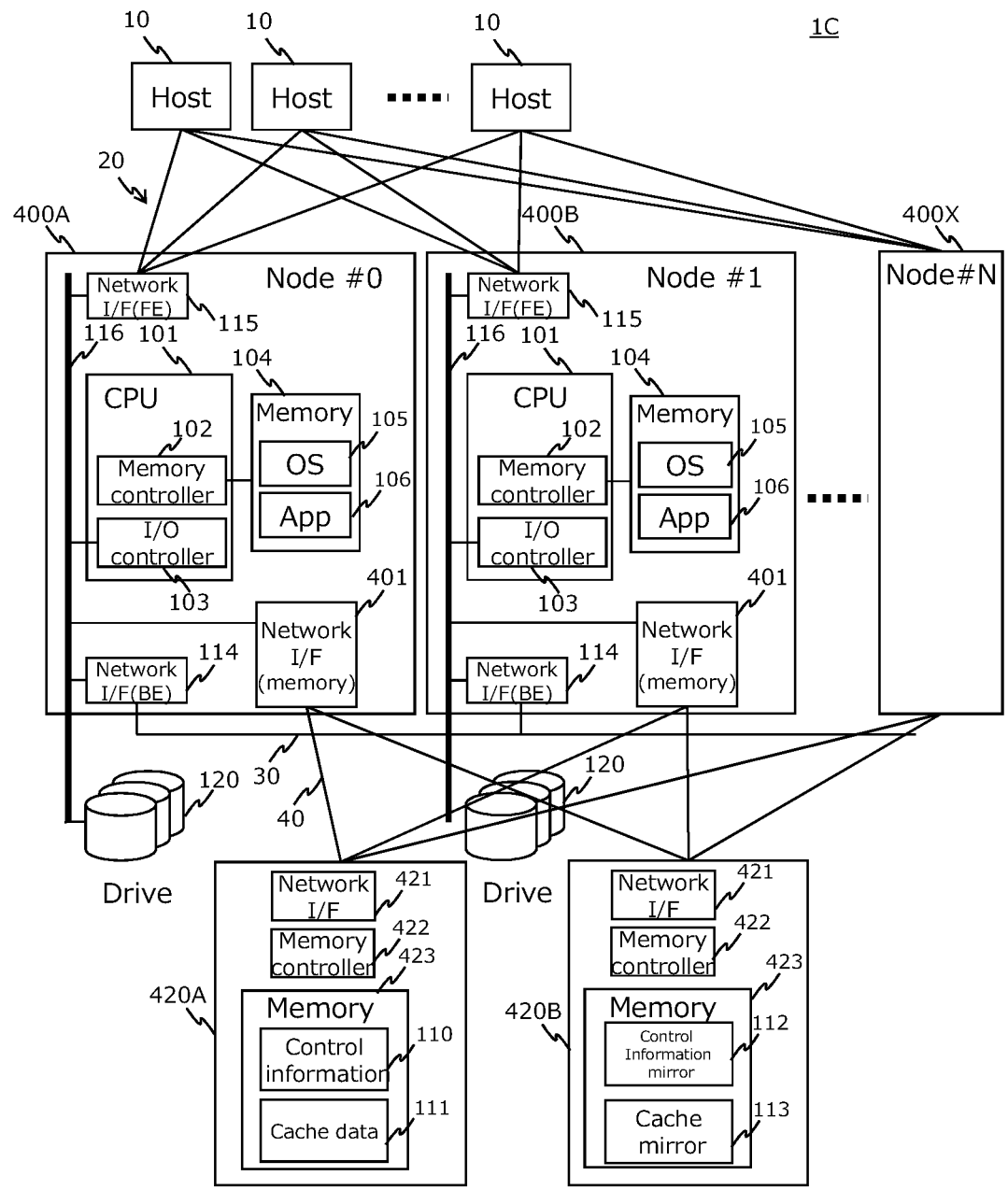
FIG. 8 is an overall configuration diagram of a storage system according to a fourth embodiment.

FIG. 8 is an overall configuration diagram of a storage system according to a fourth embodiment. The same symbols are used for the similar components as those of the storage system 1 according to the first embodiment.

The storage system 1C according to the fourth embodiment includes nodes 400 (400A, 400 400B, . . . , 400X) instead of the nodes 100 of the storage system 1 according to the first embodiment, and also includes a plurality of memory apparatuses 420 (420A, 420B) (as an example of a second memory module and a third memory module) that are coupled to a plurality of the nodes 400 via the network 40.

The node 400 does not include the memory module 107 in the node 100, but instead includes a network I/F 401. The network I/F 401 is an interface that communicates with the memory apparatus 420 via the network 40.

The memory apparatus 420 includes a network I/F 421, a memory controller 422, and a memory chip 423. The network I/F 421 is an interface that communicates with a plurality of the nodes 400. The memory controller 422 includes the function of controlling access to data stored in the memory chip 423 and the function (RAS function) of detecting the number of errors that occur in the memory chip 423, and notifying the CPU 101 of this. The memory chip 423 is, for example, a RAM chip.

In this embodiment, the memory chip 423 of the memory device 420A stores control information 110 related to the node 400A and cache data 111. The memory chip 423 of the memory device 420B stores control information mirror 112 related to the node 400A and cache mirror 113. Note that the memory chip 423 of memory device 420A may store control information 110 related to the other node 400 (the node 400B and the like) and cache data 111, and may store control information mirror 112 related to the other node 400 (the node 400B and the like) and cache mirror 113. In addition, the memory chip 423 of memory device 420B may store control information mirror 112 related to the other node 400 (the node 400B and the like) and cache mirror 113, and may store control information 110 related to the other node 400 (the node 400B and the like) and cache data 111.

In storage system 1C, each memory device 420 can be replaced with maintaining operation of the node 400.

The CPU 101 of the node 400A executes a process similar to that shown in FIG. 5 as a replacement of the memory device 420A. In step S22 in FIG. 5, the control information 110 and cache data 111, which is data to be stored in the memory device 420 are written back to the other memory apparatus 420.

According to the storage system 1C, the amount of data to be written back when replacing the memory apparatus can be suppressed, thereby reducing processing time.

The present invention is not limited to the embodiments described above, but can be implemented with modifications as appropriate to the extent that the purpose of the invention is not departed from.

For example, in the first and fourth embodiments above, the control information 110 is stored in a memory module other than the memory module storing the OS 105 and the application 106, but the invention is not limited to this, and the control information 110 may be stored in the same memory module as the memory module storing the OS 105 and the application 106.

In addition, some or all of the processing performed by the CPU in the above embodiments may be performed by hardware circuits. The program in the above embodiment may be installed from a program source. The program source may be a program distribution server or a storage medium (for example, a portable storage medium).

What is claimed is:

1. A storage system comprising:
  a storage device;
  a first node comprising of:
    a first memory module that stores an operating system (OS) and a program for managing user data to be stored in the storage device,
    a second memory module that stores cache data of the user data to be stored in the storage device, wherein the second memory module is replaceable without shutting down power supply of the first node, and
    a first processor communicatively coupled to the first memory module and the second memory module;
  a secondary node comprising a third memory module;
  wherein the first processor is configured to:
    store a copy of data to be stored in the second memory module in the third memory module, and
    when the user data is accessed from the first node and the second memory module has a failure, disable the second memory module and process the user data using the copy of the data stored in the third memory module.

2. The storage system according to claim 1, wherein
the first memory module is a memory module that is coupled to a memory controller of the first processor.

3. The storage system according to claim 1, wherein the second memory module stores control information for managing the user data.

4. The storage system according to claim 1, wherein the first processor is further configured to, when the second memory module is replaced with a new memory module, mirror the copy of the data to the new second memory module from the third memory module and process the user data using the copy of the data stored in the new memory module.

5. The storage system according to claim 1, wherein
the first memory module is replaceable without shutting down the power supply of the first node,
the first processor is further configured to:
copy the OS and the program of the first memory module to the second memory module.

6. The storage system according to claim 5, wherein
the first processor is further configured to:
when the first memory module fails, execute processing using the OS and the program copied to the second memory module.

7. The storage system according to claim 6, wherein the processor is further configured to:
when the first memory module is replaced with a new memory module, mirror the OS and the program to the new memory module from the second memory module.

8. The storage system according to claim 1, wherein:
the second memory module is configured to count a number of errors that occur in the second memory module, and notify the first processor when the number of errors exceeds a predetermined number, and
the first processor is further configured to:
in response to receiving a notification that the number of errors has exceeded the predetermined number, stop storing new data in the second memory module, write data cached in a cache in the processor in the third memory module, and display a prompt to replace the second memory module.

9. A method for controlling a storage system, the method comprising:
storing, by a first processor of a first node, an operating system and a program for managing user data in a first memory module of the first node;
storing, by the first processor, cache data of the user data in a second memory module of the first node, wherein the user data is to be stored in a storage device and the second memory module is replaceable without shutting down power supply of the first node;
storing, by the first processor, a copy of data stored in the second memory module in a third memory module of a second node; and
when the user data is accessed from the first node and the second memory module has a failure:
disabling, by the first processor, the second memory module, and
processing, by the first processor, the user data using the copy of the data stored in the third memory module.

* * * * *